United States Patent [19]

Jelinek

[11] 4,191,389

[45] Mar. 4, 1980

[54] SEALING WASHER

[75] Inventor: Jerry G. Jelinek, La Habra, Calif.

[73] Assignee: Parker-Hannifin Corporation, Cleveland, Ohio

[21] Appl. No.: 845,640

[22] Filed: Oct. 26, 1977

[51] Int. Cl.² ........................... F16K 41/00; F16J 9/06
[52] U.S. Cl. ................................... 277/166; 277/235 R
[58] Field of Search ...................... 277/30, 166, 235 B, 277/181–186, 189

[56] References Cited

U.S. PATENT DOCUMENTS

| 2,182,246 | 12/1939 | Boyer et al. | 277/30 |
| 3,195,906 | 7/1965 | Moyers | 277/166 |
| 3,519,279 | 7/1970 | Wagner | 277/166 |

Primary Examiner—Robert I. Smith
Attorney, Agent, or Firm—Maky, Renner, Otto & Boisselle

[57] ABSTRACT

A sealing washer for a socket head cap screw and the like characterized in that an elastomeric sealing ring within a rigid annular retainer has integral portions extending into radial channels in one side of the retainer. The sealing washer herein is further characterized in that the rigid annular retainer is made of relatively thin sheet stock which has folded over integral tabs to double the thickness of the retainer and to define channels on one side of the retainer which are filled with elastomeric material radiating from the elastomeric sealing ring within the retainer.

8 Claims, 6 Drawing Figures

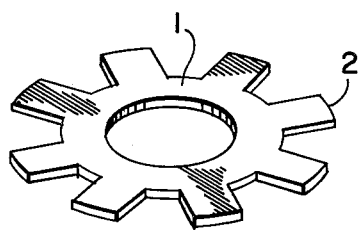
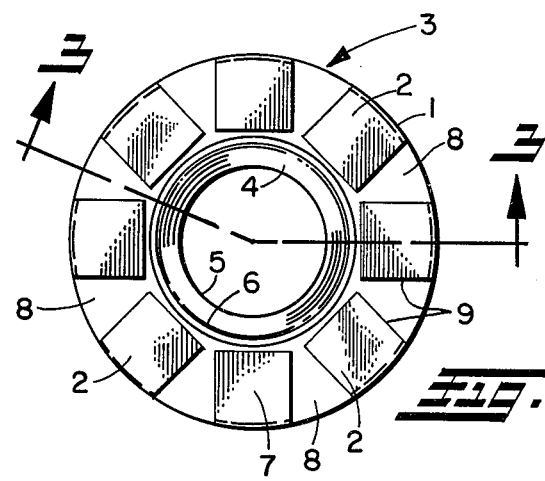
Fig. 1
Fig. 2
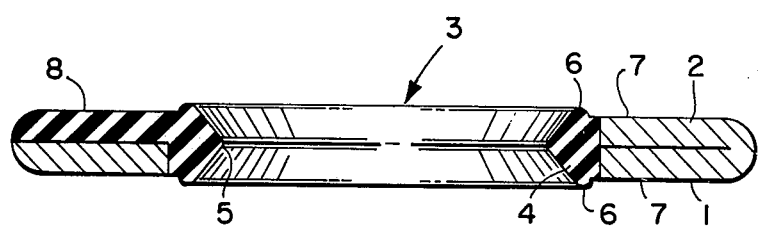
Fig. 3
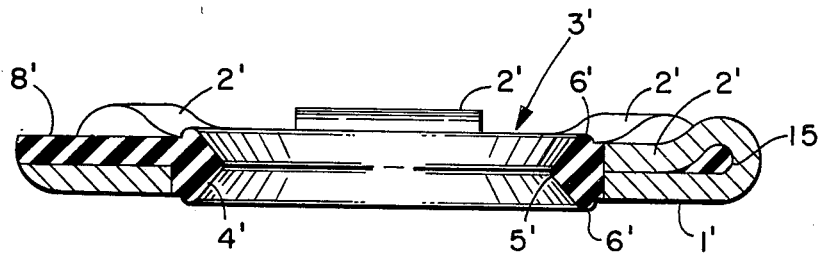
Fig. 4
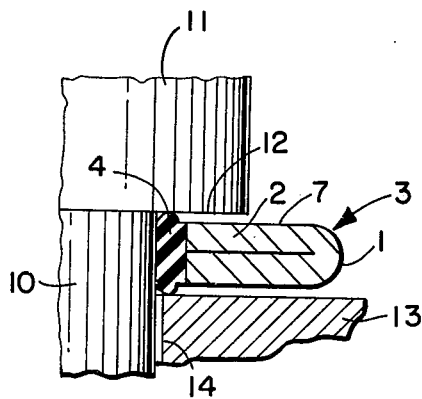
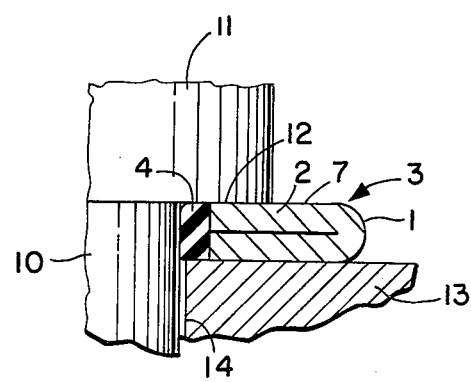
Fig. 5
Fig. 6

SEALING WASHER

BACKGROUND OF THE INVENTION

Known sealing washers generally comprise a ring of rubber-like material molded or otherwise secured within a metal washer but are not suitable for high pressure applications in connection with socket head cap screws and the like which have narrow annular shoulders defined between the heads and shanks thereof. The clamping shoulders of socket head cap screws are generally of narrow radial width, for example 1/16" on ¼" diameter cap screws, ⅛" on ⅜" diameter cap screws, ¼" on 1½" diameter cap screws, etc. whereby in high load and pressure installations using, for example, SAE grade 5 or grade 8 cap screws, the metal portion of the sealing washer must be of relatively thick stock to withstand high compression loading, and the sealing portion must be of relatively narrow radial width but yet must be retained against extrusion under high fluid pressure.

Sealing washers of the types disclosed in U.S. Pat. Nos. 2,795,444 and 3,170,701 are adapted to be used only with a fastener having a head of considerably larger diameter than the shank thereof because the sealing ring thereof has an outer portion anchored in openings through the inner portion of the retainer and hence the head of the fastener must extend radially beyond the anchor openings to apply clamping pressure on the retainer and to prevent extrusion of the sealing ring under high fluid pressure. Moreover, in these sealing washers the retainers must be made of relatively thick stock to provide for anchoring of the sealing rings thereto and for resisting cupping under high clamping pressures.

SUMMARY OF THE INVENTION

In contradistinction to known sealing washers, the sealing ring retainer herein is made of relatively thin sheet stock which is thickened to the necessary extent by folding over integral tabs which, on one side of the retainer, define channels which converge toward and open to the inner periphery of the retainer, the elastomeric sealing ring within the retainer being thin in radial dimension and having integral radially extending portions filling the channels on one side of the metal washer. The converging channels of the retainer are of small circumferential width at the periphery of the sealing ring so as to effectively resist extrusion thereof even under high fluid pressure. To further resist extrusion and to retain the sealing ring and retainer together, the radiating portions of the sealing ring may be bonded to the walls of the channels and to the inside peripheral wall of the retainer.

The sealing washer herein also makes provision for additional mechanical locking of the elastomeric sealing ring to the retainer by openings at the outer portions of the folded-over tabs into which the elastomeric material of the sealing ring extends from the channels defined between successive tabs.

Other objects and advantages will appear from the ensuing description.

BRIEF DESCRIPTION OF THE DRAWING

FIG. 1 is a perspective view of the sealing ring retainer prior to folding over of the radially extending tabs thereof;

FIG. 2 is a plan view of a sealing washer embodying the present invention;

FIG. 3 is a cross section view on enlarged scale taken substantially along the line 3—3 of FIG. 2;

FIG. 4 is a cross section view similar to FIG. 3 except illustrating another form of sealing washer embodying the present invention;

FIG. 5 is a radial cross section view showing the sealing washer herein installed around the shank of a socket head cap screw prior to tightening of the cap screw; and FIG. 6 is a view similar to FIG. 5 except showing the cap screw in fully tightened condition.

DETAILED DESCRIPTION OF THE PREFERRED EMBODIMENTS

FIG. 1 illustrates the sealing ring retainer 1 in its stamped condition having radially extending tabs 2 which are adapted to be folded over as shown in FIGS. 2 and 3 to, in effect, double the thickness of the retainer 1. The inner ends of the folded over tabs 2 are preferably tangent to the inside diameter of the retainer 1 or they may be tangent to a circle slightly larger than the inside diameter of the retainer 1.

In the manufacture of the sealing washer 3 herein, the retainer 1 with the folded over tabs 2 is placed in a mold (not shown) and the elastomeric sealing ring 4 is molded thereto to provide an inner sealing lip 5 and opposite sealing ribs 6 projecting axially beyond the opposite parallel side faces 7 of the retainer 1. The sealing ring 4 has integral portions 8 which fill the radially inwardly converging channels 9 defined between the sides of successive tabs 2 and, because the inner corners of the tabs 2 are relatively close to each other, extrusion of the sealing ring 4 material even under the influence of high fluid pressure is prevented. The molding operation may also include chemical bonding of the sealing ring 4 to the inside diameter of the retainer 1, to the inner ends of the tabs 2, and to the walls of the radially inwardly converging channels 9.

In use, the sealing washer 3 is placed over the shank 10 of the socket head cap screw 11 with lip 5 in sealed engagement with shank 10 and with one rib 6 engaging the shoulder 12 of the cap screw 11 and with the other rib 6 engaging a part 13 to be sealed. This is shown in FIG. 5 with the cap screw 11 in finger-tight condition. When the cap screw 11 is fully tightened as in FIG. 6, the outer portion of shoulder 12 firmly clamps the retainer 1 against part 13 and the ribs 6 are flattened as shown to make sealing contact with the shoulder 12 of the cap screw 11 and with the part 13 around the opening 14.

In the form of the invention illustrated in FIG. 4, the folding over of the tabs 2' of retainer 1' is done in such a way as to leave circumferentially extending openings 15 which, as a result of the molding operation, become filled with rubber-like material to mechanically interconnect the radially outer portions of the integral portions 8' of the sealing ring 4' to the retainer 1'. In addition to the mechanical locking aforesaid, chemical bonding may also be employed to bond the rubber-like material of the sealing ring 4' not only to the inside diameter of the retainer 1', but also the inner ends of the tabs 2' and to the walls of the inwardly diverging channels defined between successive tabs 2'.

In both forms of the invention as disclosed herein, the radiating portions 8 and 8' of the rubber-like material are preferably flush with the surfaces of the tabs 2 and 2' so that, when the sealing washer 3 or 3' is clamped in place, the double thickness portions of the retainer 1 or 1' are compressed between the part 13 and the portion of the cap screw shoulder 12 which is radially beyond the inside diameter of the retainer 1 or 1'.

The sealing washers 3 and 3' are economical to manufacture from relatively thin stock and the doubling of the thickness by folded over tabs 2 and 2' effectively resists cupping of the retainers 1 and 1' even under extreme clamping forces.

By way of illustrative example, a sealing washer 3 or 3' for a ¼" socket head cap screw 11 may have a retainer 1 or 1' made of 0.018" thick steel, stainless steel, 4130 alloy or like stock. The inside diameter of the retainer 1 or 1' may be 0.290" and when the tabs 2 or 2' are folded over, the effective thickness of the retainer 1 or 1' becomes 0.036" which may be subjected to high compressive loads without cupping of the retainer 1 or 1' when clamped by the shoulder 12 of a socket head cap screw 11 or like fastener having a relatively narrow annular shoulder 12. The integral portions 8 or 8' of the sealing ring 4 or 4' are also of 0.018" thickness and when the corners of the tabs 2 or 2' are spaced apart about 0.018", the 0.018" channel throats effectively resist extrusion of the sealing ring 4 or 4' when the sealing washer 3 or 3' is clamped in place as shown in FIG. 6.

I, therefore, particularly point out and distinctly claim as my invention:

1. A sealing washer comprising an elastomeric sealing ring; and a rigid annular retainer around said sealing ring having radial channels on one side thereof defined between folded-over integral tabs of said retainer, said tabs having inner ends substantially tangent to the inside diameter of said retainer; said sealing ring having integral radially extending portions extending into said channels.

2. The sealing washer of claim 1 wherein said portions are bonded to the walls of said channels and wherein the periphery of said sealing ring is bonded to the inner peripheral edge of said retainer.

3. The sealing washer of claim 1 wherein said sealing ring is of axial thickness across opposite sealing ribs thereof exceeding the thickness of said retainer.

4. The sealing washer of claim 1 wherein said channels diverge radially outwardly from narrow circumferential width at the periphery of said sealing ring.

5. The sealing washer of claim 1 wherein said tabs are folded over to leave circumferentially extending openings which intercommunicate successive channels; and wherein said portions extend into said openings.

6. A sealing washer comprising an elastomeric sealing ring; and a rigid annular retainer around said sealing ring having radial channels on one side defined between folded-over integral tabs of said retainer; said sealing ring having integral radially extending portions substantially filling said channels.

7. The sealing washer of claim 6 wherein said channels diverge from narrow circumferential width at the periphery of said sealing ring in a direction radially outwardly of said retainer.

8. The sealing washer of claim 6 wherein said tabs extend radially inwardly to substantially the inner periphery of said retainer.

* * * * *